2,282,736

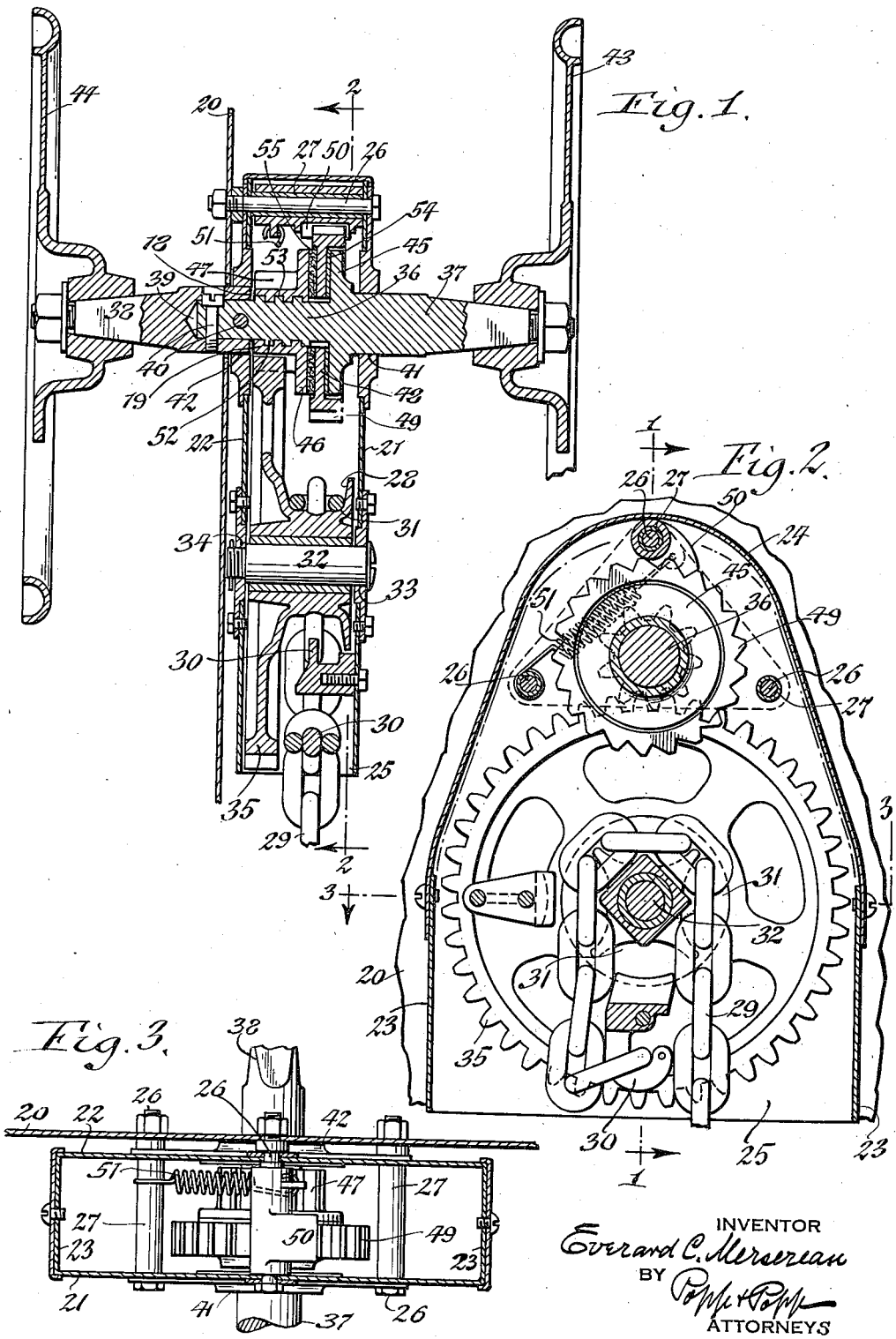
May 12, 1942.  E. C. MERSEREAU  2,282,736
HAND BRAKE MECHANISM
Filed March 30, 1939  2 Sheets-Sheet 1
INVENTOR
Everard C. Mersereau
BY
ATTORNEYS May 12, 1942.  E. C. MERSEREAU  2,282,736
HAND BRAKE MECHANISM
Filed March 30, 1939  2 Sheets-Sheet 2
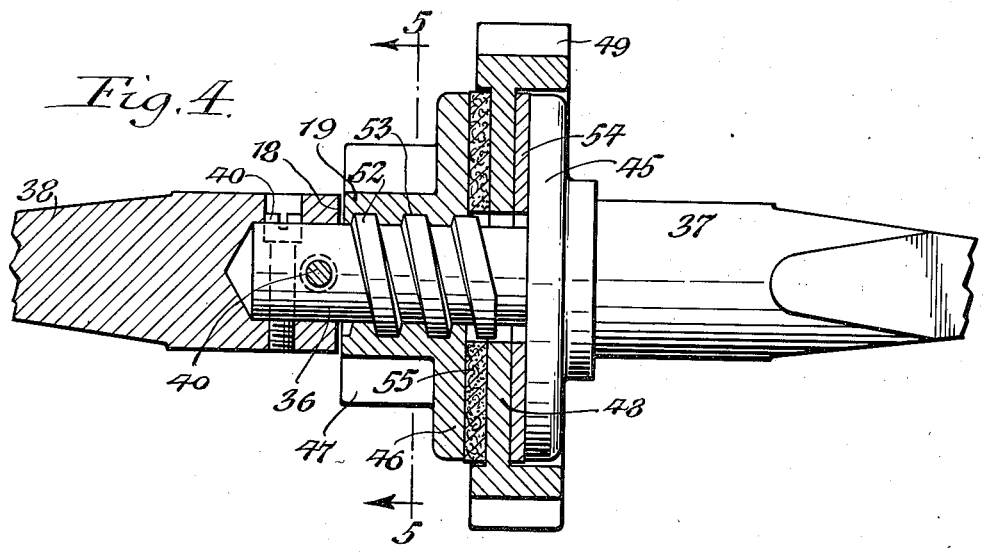
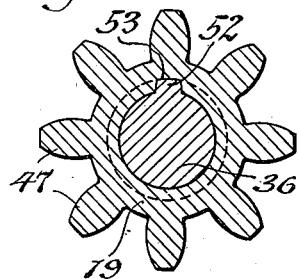
INVENTOR
Everard C. Mersereau
BY
ATTORNEYS Patented May 12, 1942

UNITED STATES PATENT OFFICE 2,282,736

HAND BRAKE MECHANISM

Everard C. Mersereau, Buffalo, N. Y., assignor to National Brake Company, Inc., Buffalo, N. Y., a corporation of New York Application March 30, 1939, Serial No. 265,011

2 Claims. (Cl. 74—505)

This invention relates to a hand brake mechanism for use in controlling the movement of railway cars by the use of manual power.

In brakes of this character as heretofore constructed, the brake shoes have usually been applied to the wheels of a car by means including a drum which was manually turned forwardly for applying the brake mechanism by moving a chain operatively connected with the brake shoes, the backward movement of the drum for holding the brake mechanism in its applied position being prevented by a ratchet detent device.

In order to release the brakes in this prior mechanism the ratchet detent was moved out of its operative position to completely release the drum and permit a rapid backward movement of the chain thereover. This has been found objectionable due to the fact that at times it is desirable to only release the brakes partly and it is also undesirable owing to the rapid backward turning of the handle or hand wheel which forms part of the drum operating mechanism and which was liable to hit the brakeman and inflict serious injury.

It is one of the objects of this invention to provide a hand operated brake mechanism for cars which permits of gradually easing off the pressure of the brake shoes and reducing the braking effect as much as may be necessary without removing the hands from the manually operated controlling wheel for operating some brake release means and which also prevents a rapid backward movement of the handle or hand wheel when releasing the brake mechanism, but instead controls such backward movement of the handle or hand wheel so that possibility of the latter striking the operator is avoided and safety against injury from this source is promoted.

A further object of the invention is to so organize the brake mechanism that complete relaxation of the mechanism is not required when releasing the same but instead permits a partial relaxation of this mechanism so that resetting or applying of the brakes can be effected quickly and easily without necessitating taking up the full slack in this mechanism before the brakes are applied as has been the case in brake mechanisms of the type heretofore in general use.

Other objects of this invention are to provide a brake controlling mechanism which avoids the use of any detent trip or release handles of the kind heretofore in use; which eliminates any undue projections on the exterior of the casing but instead leaves the same comparatively smooth and renders the same neat and attractive in appearance; which is very compact in a direction fore and aft of the mechanism so as to permit of readily installing the same where a limited amount of space is available; which permits of flexibility in the control of the car; and which permits of releasing the brake mechanism by the use of less manual power than is required for applying the same.

In the accompanying drawings:

Fig. 1 is a vertical section of one form of this invention which may be operated from the outer and inner sides of the car body but requires the handle on the one side of the car body to be turned in a clockwise direction for applying the brakes and the handle on the other side of the car body to be turned in an anti-clockwise direction for applying the brakes, this section being taken on line 1—1, Fig. 2.

Fig. 2 is a vertical cross section, taken on line 2—2, Fig. 1.

Fig. 3 is a horizontal section taken on the correspondingly numbered line in Fig. 2 and showing the detent and clutch mechanism in plan view.

Fig. 4 is a fragmentary sectional elevation, on an enlarged scale, of the main operating shaft and associated parts shown in Fig. 1.

Fig. 5 is a vertical cross section taken on line 5—5, Fig. 4.

In the following description similar characters of reference indicate like parts in the several figures of the drawings:

Although the hand brake mechanism which embodies the present improvements may be mounted on any suitable part of the car, this mechanism is represented in the drawings as mounted on one of the metal walls 20 of the car body.

The main parts of this brake mechanism are enclosed within a metal casing which also serves as the main frame for this mechanism and as shown in Figs. 1, 2 and 3, this casing is arranged on the outer side of the car wall 20, and comprises transverse front and rear walls 21, 22, two longitudinal side walls 23, and an upwardly tapering top 24 connecting the side walls, leaving the lower end of this casing open, as shown at 25. This casing may be secured to the wall of the car body in any suitable manner but preferably by means of a plurality of bolts 26 extending lengthwise through the upper parts of the front and rear walls 21, 22 of the casing and also through the wall 20 of the car body, as shown in Figs. 1, 2, and 3, each of said attaching bolts being surrounded within the casing by a spacing sleeve or bushing 27.

Although the casing is represented in the drawings as mounted on the outer side of the car body the brake controlling and operating mechanism contained therein is not dependent on such location of the casing inasmuch as the latter may be mounted within the car body without altering the brake controlling mechanism. For convenience of description, therefore, the wall 21 of the casing will be regarded at the front of the apparatus and the wall 22 at the rear of the same.

Within the lower front part of the casing is arranged a chain drum or wheel 28 over which a flexible draft member forming part of the brake mechanism is adapted to pass. This flexible member consists preferably of a chain 29 which forms an upper turn passing over the upper part of the chain drum or wheel, one end of said chain being connected with a stationary anchor 30 secured to the front transverse wall of the casing while the opposite end of the same is operatively connected with the brake shoes. The drum 28 is provided with an annular row of pockets 31 which are adapted to receive alternate links of the chain, thereby causing said drum and chain to become interlocked in the manner of a sprocket wheel, whereby the chain is positively moved forwardly or backwardly upon turning the drum in the corresponding directions and thus cause the chain to be either tightened and the brake shoes pressed against the wheels of the car or loosened for releasing the pressure of the shoes against said wheels.

This drum is mounted for rotation on a longitudinal axle or arbor 32 which is supported at its front and rear ends on bearing disks 33, 34 secured, respectively, to the front and rear walls of the casing, as best shown in Fig. 1. Within the lower rear part of the casing is arranged a gear wheel 35 which turns with the chain drum 28 and is preferably cast in one piece therewith, as shown in Fig. 1. Above the chain drum and gear wheel 35 is arranged a main operating shaft which, in the construction shown in Fig. 1, comprises a front section the inner part 36 of which passes through the front and rear walls of the casing above the chain drum and main gear wheel 35 and an outer part 37 which extends forwardly from the companion inner part 36, and a rear section 38 which has a socket 39 receiving the inner end of the inner part 36 of the front section and detachably connected therewith by means of transverse bolts 40. This main operating shaft has its front section journaled in a bearing 41 arranged on the upper part of the front wall of the casing while the rear section of this shaft is journaled in a bearing 42 arranged on the upper part of the rear casing wall 22, as shown in Fig. 1.

On the front end of the front section of the operating shaft is mounted a handle or manually operable wheel 43 which is arranged in front of the casing and wall 20 and one side of the car body and the rear section 38 of this shaft is provided with a handle or manually operable wheel 44 which is arranged on the inner side of this car wall 20. By means of these two hand wheels 43, 44 the main operating shaft may be rotated by hand either from the outer side or the inner side of the car body, as best suits the conditions under which the brake mechanism is being operated. Adjacent to the inner side of the front wall 21 of the casing the front section of the main operating shaft is provided with a front or abutment clutch disk 45 which is preferably formed integrally with this section of the shaft. Opposing the abutment clutch disk is a controlling clutch disk 46 which is connected by a hub 19 with a gear pinion 47 mounted on the rear part 36 of the main driving shaft within the casing. This gear pinion 47 meshes with the upper teeth of the main gear wheel 35, as shown in Fig. 1.

Between the front or abutment clutch disk 45 and the rear or controlling clutch disk 46 is arranged an intermediate or detent clutch disk 48 which is capable of forward rotation about the adjacent part 36 of the main operating shaft. Detent ratchet means are provided whereby the detent clutch disk 48 is permitted to turn forwardly but is prevented from moving backwardly, which detent means preferably comprise an annular row of ratchet teeth 49 arranged on the periphery of the detent disk 48 and a detent pawl or dog 50 pivoted upon the uppermost casing fastening bolt 26 within the casing and yieldingly held in engagement with the teeth 49 of the detent disk 48 by means of a spring 51 which is connected at one end with the detent pawl 50 while its opposite end may be connected with one of the lower casing fastening bolts 26, as shown in Figs. 2 and 3, or with any other available stationary part of the casing. During the forward rotation of the detent disk 48 its ratchet teeth 49 trip idly past the detent pawl 50 but backward rotation of this disk is prevented by engagement of this pawl with the tooth 49 of the detent disk immediately in front of this pawl, as shown in Fig. 2.

Clutch means are provided whereby a forward rotation of the main operating shaft in a clockwise direction, when viewed from the front of the casing, or in an anti-clockwise direction, when viewed from the rear of the casing, will cause the gear pinion 47 and its controlling disk 46 to be moved forwardly on the main operating shaft and cause the front abutment disk 45 to press against the front side of the detent disk for compelling the latter to rotate forwardly with the main operating shaft, which clutch means upon turning the main operating shaft backwardly will cause the rear controlling clutch disk to be moved away from the rear side of the detent disk and the front abutment disk to release its grip on the front side of the abutment disk and thereby permit said front and rear disks 45 and 46 to move backwardly independently of the detent disk while the latter is being held against backward movement by the dog 50. Although various means may be employed for effecting this axial movement of the gear pinion 47 and controlling disk 46 relative to the operating shaft this is accomplished in the construction shown in Figs. 1, 4 and 5 by means of a helical male screw thread 52 arranged on the inner part 36 of the front section of the operating shaft and working in a corresponding female screw thread 53 in the hub 19 which is common to the gear pinion 47 and the controlling disk 46.

Upon turning the operating shaft forwardly manually by means of the hand wheel 43 on one side of the casing or by manipulating the hand wheel 44 on the other side of the casing, the cooperating helical faces of male and female threads 52 and 53 on the operating shaft and the hub 19 of the gear wheel 47 and controlling disk 46 produces a wedging or cam action on this hub whereby the controlling disk 46 is moved axially forward relative to the operating shaft and against the rear side of the detent disk and also causes a rearward pressure of the abutment disk 45 against the front side of the detent disk 48, whereby the latter is gripped and caused to rotate forwardly with the operating shaft. While thus turning the operating shaft forwardly, the gear pinion 47 causes the main gear wheel 35 and the drum 28 connected therewith to also turn forward at a reduced speed or in the direction in which the brake chain 29 is moved forwardly to take the slack out of the same and cause it to move the brake shoes in the direction for pressing the same against the wheels of the car for braking purposes. Upon discontinuing the forward rotary movement of the main operating shaft, the same together with the chain drum are held in this position by engagement of the detent pawl 50 with the respective tooth 49 of the detent disk, whereby the brake mechanism is retained in its tightened condition and retards or stops the rotation of the wheels of the car.

If it is desired to release the braking effect of the shoes of the brake mechanism on the wheels of the car, the main operating shaft is turned backwardly to the desired extent, that is, in an anti-clockwise direction when operating the front hand wheel 43 or in a clockwise direction when turning the rear hand wheel 44. When turning the operating shaft backwardly the opposing helical faces of the male and female screw threads 52 and 53 of the main operating shaft and the hub 19 of the gear pinion and controlling disk will cause this hub to be moved rearwardly by the cam or wedge action between these cooperating helical faces, whereby the rear or controlling clutch disk 46 will be moved away from the rear side of the detent disk 48 and the pressure of the front or abutment disk 45 against the front side of the detent disk 48 will be relieved, thereby permitting the gear pinion 47, gear wheel 35, and drum 28 to be turned backwardly by the load on the chain 29 which connects this drum with the brake shoe actuating mechanism. The instant, however, that the pressure of the rear and front clutch disks 46 and 45 against the detent disk 48 is relieved by the backward movement of the gear pinion hub 19 during the backward rotation of the main operating shaft, the backward pull of the load on the brake chain 29 tends constantly to turn the gear pinion 47 backwardly relative to the main operating shaft and in doing so, the cooperating helical faces of the male and female screw threads 52, 53 on the main operating shaft and the hub 19 of the gear pinion and controlling disk 46 will instantly cause this last mentioned disk to be moved axially forward against the rear side of the detent disk 48 and also press the abutment disk 45 against the front side of this detent disk and thereby produce a clutch action whereby backward movement of the chain wheel or drum is only permitted to the same extent that the main operating shaft has been turned backwardly by the brakeman. The backward movement of the main operating shaft can be effected easily by the operator to a greater or lesser extent in accordance with the desired amount of release which it is desired to give the brake mechanism, this releasing effect on the brakes being arrested instantly when the operator ceases to turn the main operating shaft backwardly. It therefore follows that the operator by this means can release the brakes gradually and hold the brakes at any stage of the releasing operation as may be necessary to meet existing conditions, and also to immediately apply to brakes fully by again turning the main operating shaft forwardly the required extent. It will thus be evident that at no time can the main operating shaft turn backwardly fully at a rapid rate so that the operator is not liable to be hit by any rapid backwardly rotating handle or hand wheel, nor is it possible for the brake mechanism to become released or unset fully at a rapid rate which otherwise would require taking up excessive slack in the brake rigging before the brakes are again fully set. This brake mechanism therefore is under the absolute control of the brakeman and enables him to control the brakes easily and promptly to suit different conditions which may be encountered.

Stop means are provided which limit the extent of the rearward movement of the controlling disk on the operating shaft and thereby not only prevent spreading of the front and rear walls 21, 22 of the casing by engagement therewith of the abutment and controlling disks, respectively, but also enabling the brakeman to positively turn the gear pinion 47, gear wheel 35 and drum 28 to be turned backwardly in case these or other parts of the brake rigging should become stuck by rust or other cause, thereby aiding in unwinding the brake chain and the parts connected therewith for effecting a release of the brake mechanism.

This is accomplished in the construction shown in Figs. 1-4 by utilizing the front end of the rear operating shaft section 38 as a stop or shoulder 18 which opposes the rear end of the hub 19 but is spaced therefrom when the controlling disk 46 is in its forward or operative position, as shown in Figs. 1 and 4. If upon turning the operating shaft 37, 38 backwardly and moving the hub 19 and controlling disk 46 axially rearward the latter is not turned backwardly by sufficient load or pull on the draft chain 29 or due to the drum 28 and the gear wheel 35 being stuck or any other reason, then the controlling disk 46 will move backwardly idly until the rear end of the same engages stop or shoulder 18 on the operating shaft 37, 38. When this occurs the gear pinion 47 becomes locked on the operating shaft and turns backwardly therewith as a unit, whereby a positive backwardly rotary movement is imparted to the gear wheel 35 and drum 28 by the manual power applied to the operating shaft 37, 38 and the draft chain is paid out from the drum. If therefore the gear pinion 47, the gear wheel 35, the drum 28 or any part of the brake rigging connecting this drum with the brake shoes should become stuck or operate sluggishly due to rust, dirt, snow, ice or other obstruction the resistance which otherwise might be imposed by said gear pinion and wheel and drum on the releasing movement of the brake rigging is eliminated and thereby permits the remaining parts of the brake mechanism to relax and release the brake shoes from the car wheels. The inner part of the rear shaft section 38 has the form of a collar or tubular portion which serves as a stop inasmuch as the inner shoulder 18 thereof is adapted to be engaged by the adjacent end of the hub 19 of the gear pinion for limiting the rearward movement of the latter on the front section 37 of the operating shaft, and as the periphery of this collar engages the bore 42 of the bearing in the rear wall of the housing this collar also serves to journal the rear part of the operating shaft on the housing.

Due to the cooperating cam faces which are formed respectively on the operating shaft and controlling screw nut 19 and the action on the gear pinion on the gear wheel, the chain drum can be turned forwardly with great force for effectively applying the brake mechanism by the sole use of manual power but since the backward rotation of the operating shaft by manual power is aided materially by the backward pull of the load on the controlling disk it follows that the release of the brake mechanism can be effected with much less power than that required for applying the same. This is particularly advantageous in case a comparatively powerful brakeman has applied the brakes heavily and thereafter a brakeman of less strength has to release the brakes.

For the purpose of increasing the grip of the controlling disk 46 against the side of the detent disk a friction disk 55 of suitable material is interposed between these members, and to permit prompt release of the abutment disk 45 from the detent disk a releasing disk 54 of suitable material is interposed between these last mentioned members, as shown in Figs. 1 and 4.

This hand brake mechanism is not only comparatively simple in construction but the same is also composed of relatively few parts which are not liable to get out of order and as a whole this brake mechanism is also very compact so that it it capable of being easily installed in places where a limited amount of space is available.

Inasmuch as this mechanism permits of limiting the extent of release of the brake mechanism, it is possible to again fully set the brakes without the necessity of taking up an undue amount of slack in the brake rigging after the releasing operation before the brakes are again applied.

I claim as my invention:

1. A hand brake mechanism comprising a housing having outer and inner walls, an operating shaft extending through said walls and journaled thereon adjacent to one end thereof in a bearing on one of said walls, a stop collar secured to the opposite end of said shaft and journaled in a bearing on the other of said walls, a clutch disk fixed on said shaft adjacent to one of said walls, a gear pinion arranged on said shaft adjacent to the other wall and having a screw connection therewith and also provided with a clutch disk, a gear wheel meshing with said gear pinion and adapted to be operatively connected with the brake member to be actuated, a detent disk arranged between said clutch disks and adapted to be gripped thereby and also released therefrom, and a one-way holding means operating on said detent disk.

2. A hand brake mechanism comprising a housing having front and rear walls, an operating shaft extending through said walls and having a front part journaled in a bearing on the front wall of the housing, a stop collar secured to the rear part of said shaft and journaled in a bearing on the rear wall of said housing, a gear pinion mounted on said shaft adjacent to said collar and provided with an internal screw thread which cooperates with an external screw thread on the adjacent part of said shaft and also provided with a rear clutch disk, a front clutch disk fixed on said shaft adjacent to said front wall, a detent disk arranged between said clutch disks and adapted to be gripped thereby and also released therefrom, a one-way detent means cooperating with said detent disk, and a gear wheel meshing with said gear pinion and operatively connected with the brake member to be actuated.

EVERARD C. MERSEREAU.